United States Patent [19]
Hinlein

[11] Patent Number: 5,003,420
[45] Date of Patent: Mar. 26, 1991

[54] LOW PROFILE HEAD-LOAD BEAM SLIDER ARM FOR DISK DRIVE

[75] Inventor: Sigmund Hinlein, Sudbury, Mass.

[73] Assignee: Digital Equipment Corporation, Maynard, Mass.

[21] Appl. No.: 418,945

[22] Filed: Oct. 6, 1989

Related U.S. Application Data

[63] Continuation of Ser. No. 172,190, Mar. 23, 1988, abandoned.

[51] Int. Cl.⁵ .............................................. G11B 5/48
[52] U.S. Cl. ................................ 360/104; 360/106
[58] Field of Search ............... 360/104, 105, 106, 109, 360/97.01, 99.01; 369/170

[56] References Cited

U.S. PATENT DOCUMENTS

| | | | |
|---|---|---|---|
| 4,535,374 | 8/1985 | Anderson et al. | 360/105 |
| 4,605,979 | 8/1986 | Inoue et al. | 360/104 |
| 4,774,610 | 9/1988 | Kinjo | 360/104 |
| 4,792,875 | 12/1988 | Ohdaira | 360/104 |
| 4,797,763 | 1/1989 | Levy et al. | 360/104 |

FOREIGN PATENT DOCUMENTS

| | | | |
|---|---|---|---|
| 0033680 | 8/1981 | European Pat. Off. | |
| 0208280 | 1/1987 | European Pat. Off. | 360/106 |
| 0120327 | 6/1986 | Japan | 360/104 |
| 0239460 | 10/1986 | Japan | 360/105 |
| 0076079 | 4/1987 | Japan | 360/105 |

OTHER PUBLICATIONS

May, "IBM Technical Disclosure Bulletin", vol. 26, No. 2, Jul. 1983.

*Primary Examiner*—David J. Severin
*Attorney, Agent, or Firm*—Fish & Richardson

[57] ABSTRACT

An arm for mounting a head in a disk drive, the arm comprising an end region adapted to carry the head on a mounting surface and a pair of side regions angularly disposed with respect to the mounting surface to straddle the head. That is, the side regions and mounting surface form a channel within which the head is disposed. Thus, the profile (i.e., height) of the arm is reduced. This allows disks in a multiple disk drive to be spaced by a reduced amount.

24 Claims, 5 Drawing Sheets

LOW PROFILE HEAD-LOAD BEAM SLIDER ARM FOR DISK DRIVE

This is a continuation of copending application Ser No. 07/172,190 filed on Mar. 23, 1988 now abandoned.

BACKGROUND OF THE INVENTION

This invention relates to load beam slider arms for carrying heads in a disk drive, such as a disk reader or servowriter.

As is known, in a disk drive a head, such as a magnetic head, for reading data from or writing mapping information onto the disk is typically mounted at one end of a load beam slider arm. The other end of the load beam slider arm is secured to an actuator arm, which is in turn coupled to the drive shaft of a motor, such as a servo or stepping motor. The head is moved to a selected track on the disk by the motor via the actuator and load beam slider arms.

A conventional load beam slider arm comprises a thin, resilient metal blade. The head is attached by a gimbal mechanism to a slider, which is in turn secured, for example by epoxy, to a planar surface of the blade's distal end. The blade resiliently urges the head against the surface of the disk when the disk is at rest. As the disk rotates, a stream of air passing between the slider and disk lifts the head sufficiently to space the head from the disk surface. To stiffen the blade and provide added resiliency, the sides of the blade typically are each angularly disposed with respect to the planar surfaces of the blade in the opposite direction from the planar surface on which the head is disposed. For example, the sides are bent towards the lower surface (i.e., downward) of a blade having the head disposed on the upper surface thereof. Thus, the height (i.e., profile) of the load beam slider arm extends from the edges of the downward-folded sides to the upper surface of the head, typically about 0.0745 inches. Also, because the sides are bent away from the head, the region of the load beam slider arm which carries the head is typically fairly narrow, often narrower (for example, 0.075 inches) than the width of the head itself.

In multiple disk drives, a pair of such slider arms are disposed back-to-back between a pair of disks, one head communicating with the lower surface of the upper disk, and the other head with the upper surface of the lower disk The disks must be spaced sufficiently (for example, by 0.2 inches) to make room for both load beam slider arms.

SUMMARY OF THE INVENTION

The invention features, in general, an arm for mounting a head in a disk drive, comprising a first member adapted to carry the head on a surface thereof, and a second member for stiffening the first member, the second member being angularly disposed with respect to the surface and disposed on the same side of the surface the head. This reduces the profile (i.e., height) of the arm while maintaining the same degree of stiffness, thereby allowing disks in a multiple disk drive to be spaced closer together. Thus, the size of the disk drive is reduced, or, alternately, more disks can be placed in a disk drive of a predetermined size.

Preferred embodiments include the following features. The first member comprises a blade including the surface, and the second member comprises a wall integrally formed with the blade and disposed at an angle of approximately 90° with respect to the surface. A portion of the second member is adapted to restrain an electrical lead of the head against the second member, and a portion of the second member may also be adapted to be engaged for mounting and demounting the arm in the disk drive. The second member includes a tab forming a channel with the second member for receiving the electrical lead, the tab having at least one surface adapted to be engaged for mounting and demounting the arm in the disk drive. A base is proximally disposed with respect to the first member for mounting the arm on an actuator in a disk drive, the base preferably being integrally formed with the first and second members. The base also includes a tab forming a channel for receiving the electrical lead. Preferably, the first and second members are integrally formed.

In one aspect of the invention, an arm for mounting a head in a disk drive comprises an end region adapted to carry the head on a mounting surface and a pair of side regions angularly disposed with respect to the mounting surface to straddle the head. Thus, the pair of side regions and mounting surface form a channel for receiving the head. This arrangement stiffens the arm while also inhibiting twisting of the arm about its longitudinal axis.

Preferred embodiments include the following features. The end region comprises a blade including the mounting surface, the head being adapted to be disposed on a gimbal on the mounting surface, the pair of side regions each comprising a wall, with the head being disposed adjacent at least a portion of each wall. The wall portions are spaced sufficiently to allow the head to move on said gimbal without contacting either wall portion. The wall portions are preferably integrally formed with the blade. A portion of at least one of the side regions is adapted to restrain an electrical lead of the head against the side region. A portion of at least one side region is adapted to be engaged for mounting and demounting the arm in the disk drive.

Another aspect of the invention features a disk drive comprising at least one disk, a head for communicating with the disk, and an arm for mounting the head in the disk drive, the arm comprising an end region adapted to carry the head on a mounting surface thereof, and a pair of side regions longitudinally disposed alone the arm, the side regions being angularly disposed with respect to the mounting surface to form a channel with the mounting surface within which the head is disposed.

Preferred embodiments include the following features. The disk drive includes a pair of spaced disks, and a pair of the arms are mounted back-to-back in the disk drive, with the head carried by the first arm communicating with a surface of the first disk and the head carried by the second arm communicating with a surface of the second disk. The reduced profile (i.e., height) of the arms allows the disks to be spaced by a reduced amount. Thus, the size of the disk drive is reduced, or, alternately, more disks can be placed in a disk drive of predetermined size.

In other embodiments, the head is disposed on a gimbal on the mounting surface, the mounting surface having a width in the channel selected to stiffen the arm in a direction perpendicular to a longitudinal axis of the arm and to allow the head to move on the gimbal without contacting the pair of side regions. The arm includes a base region, proximally disposed with respect to the end region and pair of side regions, for mounting the arm on an actuator. The actuator has a longitudinal axis, and the base region and actuator comprise means for aligning the arm and head laterally along the actuator's longitudinal axis. The base region and actuator also include means for aligning the arm and head axially with respect to the actuator's longitudinal axis. The base region, end region, and side regions are preferably integrally formed.

Other features and advantages of the invention will be apparent from the following description, and from the claims.

Description of the Preferred Embodiment

Drawings

We first briefly describe the drawings.

Structure and Operation

Figure 1:
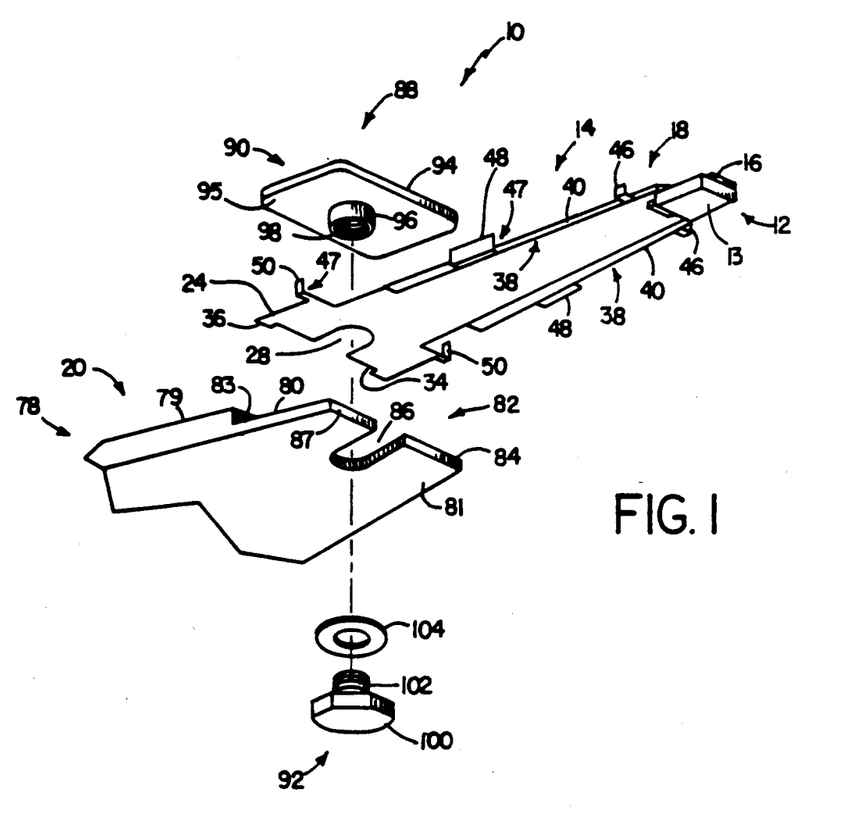
FIG. 1 is an exploded perspective view of the head mounting assembly of the invention.
Figure 2:
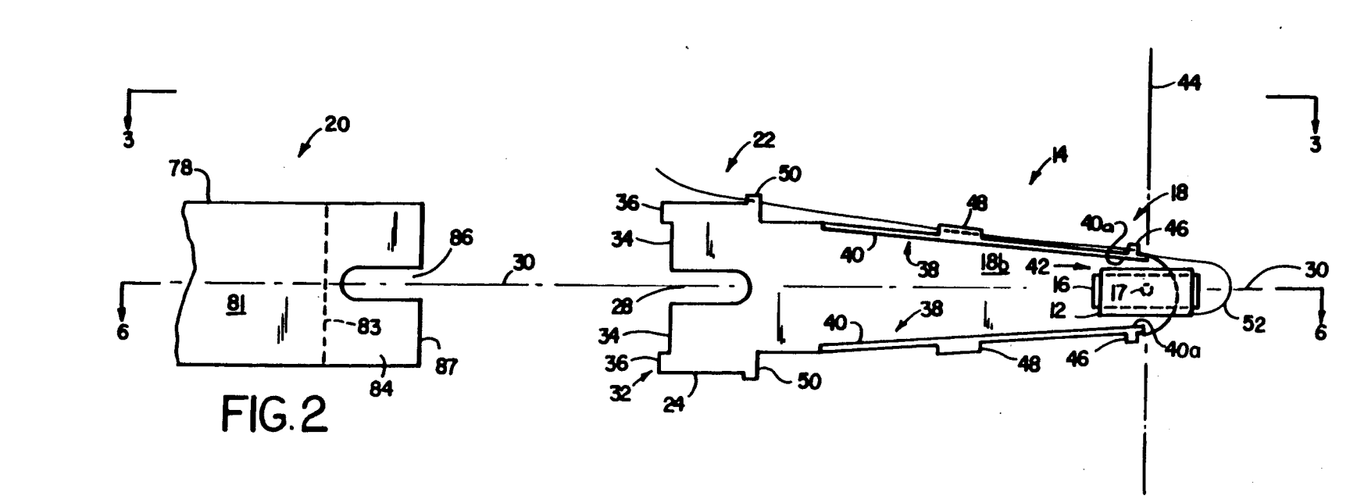
FIG. 2 is a plan view of the underside of a load beam slider arm and actuator arm of the head mounting assembly of FIG. 1.
Figure 3:
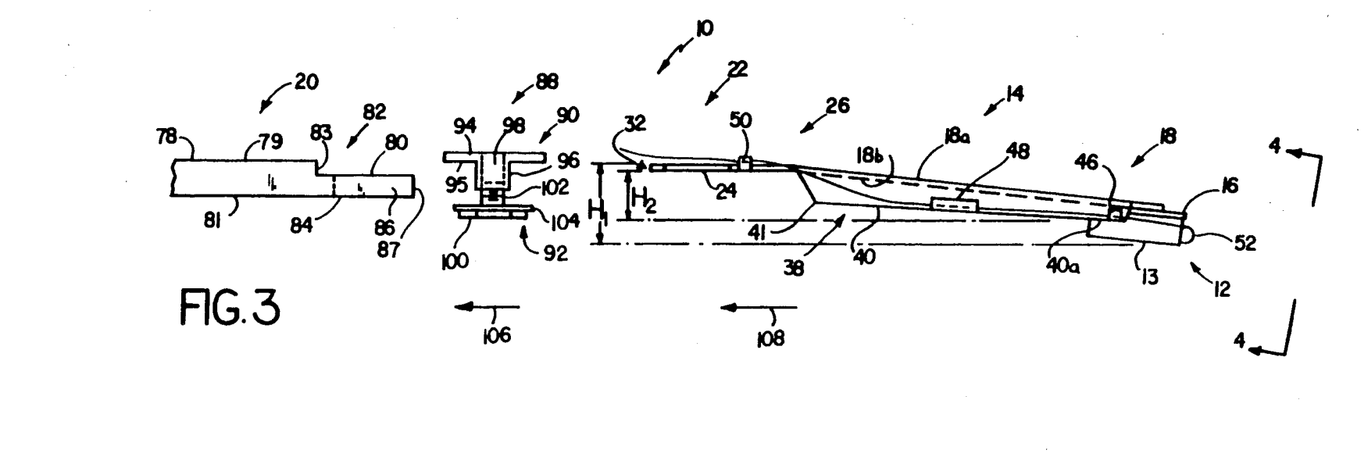
FIG. 3 is a side view of the load beam slider arm and actuator arm of FIG. 2 taken along line 3—3, and also of components of a clamp for securing the arms together.

Referring to FIGS. 1-3, mounting assembly 10 for mounting magnetic head 12 within a disk drive (such as a disk reader or servowriter) comprises detachable load beam slider arm 14 for carrying and supporting magnetic head 12, which is in turn secured to slider 16 by gimbal mechanism 17. Magnetic head 12 is any suitable head for communicating with a magnetic disk (not shown) in a conventional manner, such as by writing mapping information onto the disk (as in a servowriter) or reading data from the disk (as in a disk reader). Slider 16 is fastened, for example, by epoxy, to distal end 18 of load beam slider arm 14 Actuator arm 20 supports and moves load beam slider arm 14 and head 12 among selected tracks on the magnetic disk in response to an actuator mechanism, such as a motor (not shown), for example, a servomotor or stepping motor.

Load beam slider arm 14 is a resilient metal (such as stainless steel) blade which is relatively thin (for example, 0.003 inches) to reduce its mass and allow a stream of air which passes between slider 16 and the disk during disk rotation to lift head 12 sufficiently to space underside 13 of head 12 from the disk surface. This protects head 12 from being damaged by the rapidly rotating (e.g., at 3000 rpm) disk during operation. Head 12 is disposed on lower surface 18b of distal end 18. Proximal end 22 of slider arm 14 forms base 24 disposed at a slight angle (for example, 1.5° to 2°) with respect to distal end 18 through bend region 26. This serves to "preload" head 12 into contact with the disk surface when the disk is at rest. Base 24 and bend region 26 are integrally formed with distal end 18 from a single piece of metal; thus, base 24 and bend region 26 are each also about 0.003 inches thick. Load beam slider arm 14 has a total length of about 1.15 inches.

Base 24 is approximately 0.2 inches in length and 0.4 inches wide. Mounting and alignment slot 28, approximately 0.1 inches wide, is disposed in base 24 laterally centered about longitudinal axis 30 of load beam slider arm 14. Slot 28 is approximately as long as base 24 and opens at proximal surface 32 thereof. A pair of shallower slots 34 are recessed from proximal surface 32 to form a pair of fingers 36, each about ⅛ of the width of base 24, at each side of base 24 for purposes discussed in detail below.

To stiffen load beam slider arm 14 and enable it to maintain its resiliency during repeated use in the disk drive (i.e., to prevent distal end 18 from being permanently bent away from the disk surface by the stream of air), a pair of stiffeners 38 are disposed longitudinally along distal end 18 between base 24 and the tip of distal end 18. Stiffeners 38 additionally inhibit twisting of load beam slider arm 14 about longitudinal axis 30. Stiffeners 38 preferably comprise a pair of side walls 40 integrally formed with the remainder of distal end 18. Side walls 40 are disposed at an angle (i.e., bent) with respect to upper and lower planar surfaces 18a, 18b, respectively, of distal end 18. More specifically, side walls 40 are bent downward (i.e., away from upper surface 18a and towards lower surface 18b) to be disposed on the same side of (i.e., beneath) distal end 18 as head 12. Stated alternately, side walls 40 make an angle of less than 180°, preferably approximately 90°, with lower surface 18b, while making an angle of greater than 180°, preferably about 270°, with lower surface 18b. This is the reverse of the slider arm described in the Background of the Invention section above, in which the sides are bent in the opposite direction with respect to the surface of the slider arm on which the head is disposed.

With this arrangement, head 12 and side walls 40 are positioned on the same side of lower surface 18b. The total height (i.e., the profile) $H_1$ (FIG. 3) of load beam slider arm 14 (including head 12) is reduced to approximately 0.0445 inches. The profile of load beam slider arm 14 itself below lower surface 18b ($H_2$) is only about 0.0355 inches. As discussed in detail below, the reduced profile of slider arm 14 permits the spacing between disks in a multiple disk drive to be concomitantly reduced.

Figure 4:
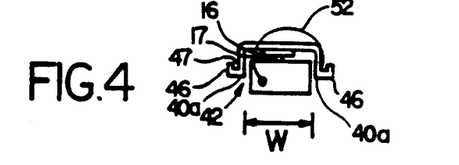
FIG. 4 is a front view of the load beam slider arm of FIG. 3 taken along line 4—4.

Referring also to FIG. 4, distal portions 40a ; of side walls 40 straddle magnetic head 12, forming channel 42 with lower surface 18b within which head 12 is disposed. Thus, the minimum width, W, between distal side wall portions 40a is large enough (for example, 0.15 inches) to not only provide room for head 12 between side wall portions 40a but to also allow head 12 to move on gimbal 17 without contacting either distal side wall portion 40a. This increased width within channel 42

(i.e., in the region in which receives head 12) increases the stiffness of distal end 18 with respect to axis 44 perpendicular to longitudinal axis 30. Thus, the positional stability of head 12 on longitudinal axis 30 is increased. This is especially important when load beam slider arm 14 is used with a rotary actuator in a "seek mode", in which actuator arm 20 rapidly pivots load beam slider arm 14 and head 12 along a tangental arc with respect to axis 44.

A pair of tabs 46, 48 are disposed on each side wall 40, and a pair of similar tabs 50 are disposed on the sides of base 24. As shown in FIG. 1 and 3, tabs 46, 48 form "U"-shaped channels 47 with the outer surfaces of side walls 40. Tabs 46, 48 provide restraints in channels 47 for electrical lead 52 connected to head 12 from circuitry in the disk drive. Electrical lead 52 is restrained against one of the side walls 40 simply by bending tabs 46, 48 of that side wall toward the wall with any suitable tool with lead 52 disposed in channels 47. Moreover, tabs 48, which are wider than tabs 46, provide a pair of "handles" for engagement by a slider arm mounting tool (not shown). This facilitates insertion and removal of load beam slider arm 14 on actuator arm 20 (in a manner described in detail below) while maintaining the mounting tool away from head 12 to avoid possible damage thereof by the mounting tool.

Figure 5:
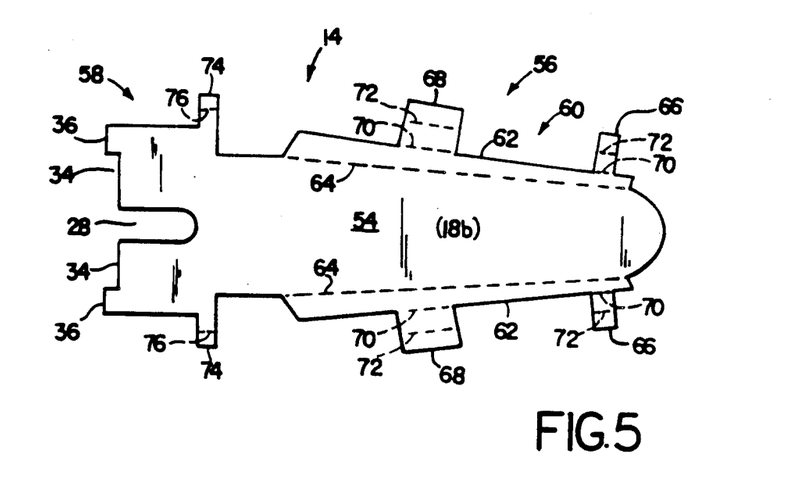
FIG. 5 is a plan view of a metal sheet pattern useful in understanding the fabrication of the load beam slider arm of FIGS. 1-4.

Referring also to FIG. 5, load beam slider arm 14 is fabricated by etching or stamping sheet 54 of stainless steel in pattern 56. Proximal end 58 of metal sheet 54 is stamped in the shape of base 24 and includes slots 28, 34. Distal end 60 includes a pair of flaired edges 62 which are spaced from line 64 by an amount corresponding to the height of each side wall 40. Such spacing varies from a maximum of 0.03 inches at proximal end 41 (FIG. 3) of side wall 40 to a minimum of 0.02 inches at distal end 40a. Each side wall 40 is formed simply by bending flaired edges 62 along line 64 upwards with respect to surface 18b until the desired angle with surface 18b (e.g., 90°) is reached. An angle of 90° provides the greatest stiffness, but the angle may alternately be either acute or obtuse as desired.

Each flaired edge 62 includes a pair of projections 66, 68 which are used to form tabs 46, 48, respectively. Each tab 46, 48 is formed (after edges 62 have been folded on line 64) by first bending each projection 66, 68 outward with respect to the associated side wall 40 along line 70 until the projection makes an angle of about 90° with side wall 40. Then, projections 66, 68 are bent downward with respect to associated side walls 40 along lines 72 to be approximately parallel thereto (see FIG. 1). Proximal end 58 includes a pair of projections 74 from which tabs 50 are formed simply by bending projections 74 downward 90° along line 76.

Figure 6:
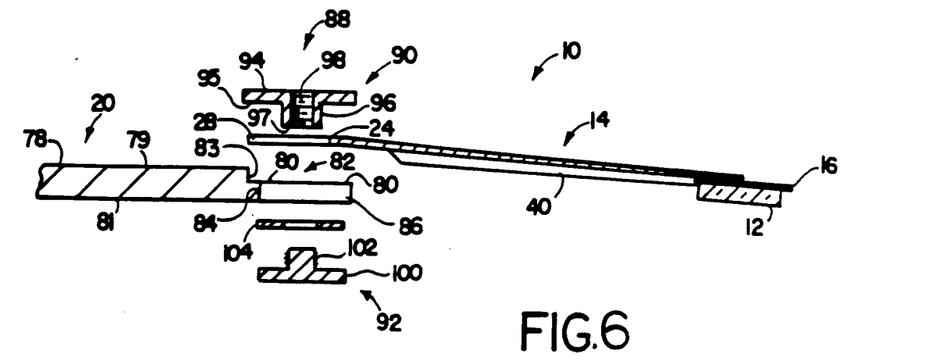
FIG. 6 is an exploded cross-sectional view of the load beam slider arm and actuator arm of FIG. 2 taken along line 6—6, and also of the components of the clamp of FIG. 3.
Figure 7:
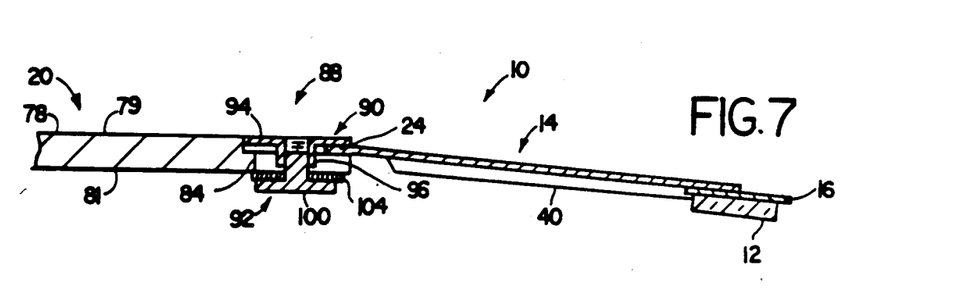
FIG. 7 is a cross sectional view of the head mounting assembly of FIG. 6 fully assembled.

Referring also to FIGS. 6 and 7, actuator arm 20 has a relatively thick (e.g., about 0.05 inches) proximal end 78 and is fabricated from aluminum to reduce its mass while maintaining a high degree of stiffness. This is desirable because, as discussed, in some applications actuator arm 20 is rapidly moved during operation to position head 12 among various disk tracks. Upper surface 80 of the distal end of actuator arm 20 is recessed (for example, by grindinq) from upper surface 79 of proximal end 78 to form slot-shaped cavity 82 in actuator arm 20. Cavity 82 extends the entire width of the distal end of actuator arm 20 and is also about as wide as load beam base 24, which cavity 82 receives. Cavity 82 terminates at edge 83 and has a length approximately equal to that of base 24. Cavity 82 is about 0.03 inches deep for purposes discussed in detail below.

The distal end of actuator arm 20 thus comprises shelf 84 of reduced thickness (about 0.02 inches thick) from proximal end 78 and formed integrally therewith. Mounting and alignment slot 86, approximately 0.1 inches wide, is disposed completely through shelf 84 and located at the lateral center thereof (i.e, slot 86 is centered about longitudinal axis 30 of actuator arm 20). Slot 86 opens at distal surface 87 of actuator arm 20 and extends approximately the entire length of shelf 84. Thus, with base 24 of load beam slider arm 14 inserted and laterally centered in cavity 82, portions of alignment and mounting slots 28, 86 of load beam slider arm 14 and actuator arm 20, respectively, are in registry.

Base 24 is secured to actuator arm shelf 84 by threaded clamp 88, which is shown disassembled in FIGS. 1 and 6 and partially assembled in FIG. 3. Clamp 88 comprises threaded nut plate 90, bolt 92, and also actuator arm shelf 84. Nut plate 90 includes rectangular stainless steel plate 94, approximately 0.02 inches in thickness, having about the same length and width dimensions as base 24. Generally circular throat 96 is disposed at approximately the lateral and longitudinal centers of plate 94 and protrudes about 0.018 inches from underside 95 of plate 94. The outer diameter of throat 96 is slightly less than 0.1 inches, enabling throat 96 to snugly fit within slots 28, 86. Throat 96 (and the portion of plate 94 from which throat 96 protrudes) includes threaded opening 98 for receiving bolt 92.

Bolt 92 is also stainless steel and comprises a thin, hexagonal-shaped, ⅛ inch head 100 (for example, 0.02 inches thick) and threaded stem 102, approximately 0.06 inches long, for engaging threaded opening 98 of nut plate 90 from underside 81 of shelf 84.

As shown in FIG. 3, mounting assembly 10 is assembled by first loosely assembling bolt 92 and nut plate 90. Preferrably, stainless steel washer 104 (approximately 0.15 inches in diameter and 0.005 inches thick) is used with bolt 92 for purposes to be explained. Washer 104 is placed on bolt 92 and stem 102 turned a short distance into threaded portion 98 of nut plate 90. Nut plate 90, bolt 92, and washer 104 are then inserted onto shelf 84 as a unit by sliding nut plate throat 96 into slot 86 in the direction of arrow 106 so that bolt 92 and washer 104 are disposed below shelf 84 and nut plate 90 is located above shelf 84. Because bolt 92 is only slightly threaded into nut plate 90, underside 95 of plate 94 will only loosely engage upper surface 80 of shelf 84 at this stage.

Then, load beam slider arm 14 is inserted on actuator arm 20 by inserting fingers 36 of base 24 between plate 94 and shelf 84, aligning slot 28 with throat 96, and sliding base 24 into actuator arm cavity 82 in the direction of arrow 108. Because slots 28, 86 are disposed at the lateral centers of load beam slider arm 14 and actuator arm 20, respectively, load beam slider arm 14 (and thus head 12) is laterally aligned with actuator arm 20 on longitudinal axis 30 when slot 28 is inserted about throat 96. Load beam slider arm 14 (and hence head 12) is axially aligned on longitudinal axis 30 by the engagement of fingers 36 with edge 83 of cavity 82. Slots 34 minimize the width of proximal surface 32 of base 24 that abuts cavity edge 83 and thus helps in squaring base 24 within cavity 82.

Figure 8:
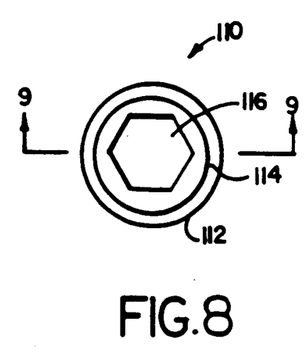
FIG. 8 is a top view of a tool useful in assembling the head mounting assembly of FIGS. 1-7.
Figure 9:
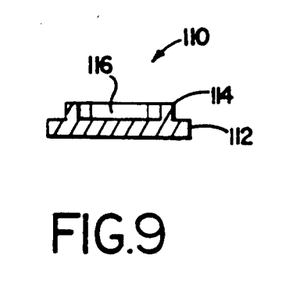
FIG. 9 is a cross-sectional view of the tool of FIG. 8 taken along line 9—9.

Referring also to FIGS. 8 and 9, while holding load beam slider arm 14 in place within cavity 82 (for example, by a mounting tool which engages tabs 48), bolt 92 is fully tightened into nut plate 90. As discussed in detail below, in multiple disk drives, multiple actuator arms 20 for the several heads are spaced as narrowly as possible. Thus, circular wrench 110 is used to tighten bolt 92 into nut plate 90. Wrench 110 comprises hardened tool steel and is about 0.9 inches in diameter. Wrench 110 is about 0.06 inches thick and includes base 112 on which raised shoulder 114 is disposed. One-eighth inch, hexagonal-shaped socket 116 is disposed in shoulder 114 and is slightly deeper than the thickness (0.02 inches) of bolt head 100. Wrench 110 is operated manually by placing it beneath actuator arm shelf 84, engaging bolt head 100 with socket 116, and turning wrench 110 to finger-tighten bolt 92 into threaded opening 98. The diameter of wrench 110 is larger than the width (0.4 inches) of shelf 84, thereby facilitating operation. Washer 104 prevents bolt head 100 from digging into underside 81 of shelf 84 (which would produce metal flakes which might damage the disk drive) and into the sides of slot 86.

With bolt 92 fully tightened into nut plate 90, load beam slider arm base 24 is securely clamped to shelf 84 (i.e., between underside 95 of plate 94 and shelf upper surface 80). Thus, clamp 88 overcomes the torque exerted on load beam slider arm 14 during operation (i.e., the forces exerted by the disk rotation- induced air stream and by rapid repositioning of head 12 by the actuator mechanism), thereby securely maintaining the lateral and axial alignment of head 12 and load beam slider arm 14 on longitudinal axis 30. Electrical lead 52 is restrained between one of tabs 50 and nut plate 90 simply by bending tab 50 toward plate 94 with lead 52 disposed in channel 47.

Load beam slider arm 14 is easily removed from actuator arm 20 for replacement or repair simply by engaging bolt head 100 with wrench 110 and slightly backing off (i.e., loosening) bolt 92 just enough (e.g., ¼ to ½ of a turn) to allow base 24 to be slid outward (i.e., in the opposite direction from arrow 108) from between nut plate 90 and shelf 84, and removing beam slider arm 14 from cavity 82 while keeping bolt 92 attached to nut plate 90 and maintaining throat 96 within shelf slot 86. That is, nut plate 90, bolt 92 and washer 104 remain assembled and attached to shelf 84. Another load beam slider arm 14 (carrying a new or repaired head 12) is then secured to actuator arm 20 following the above-discussed procedure.

Figure 10:
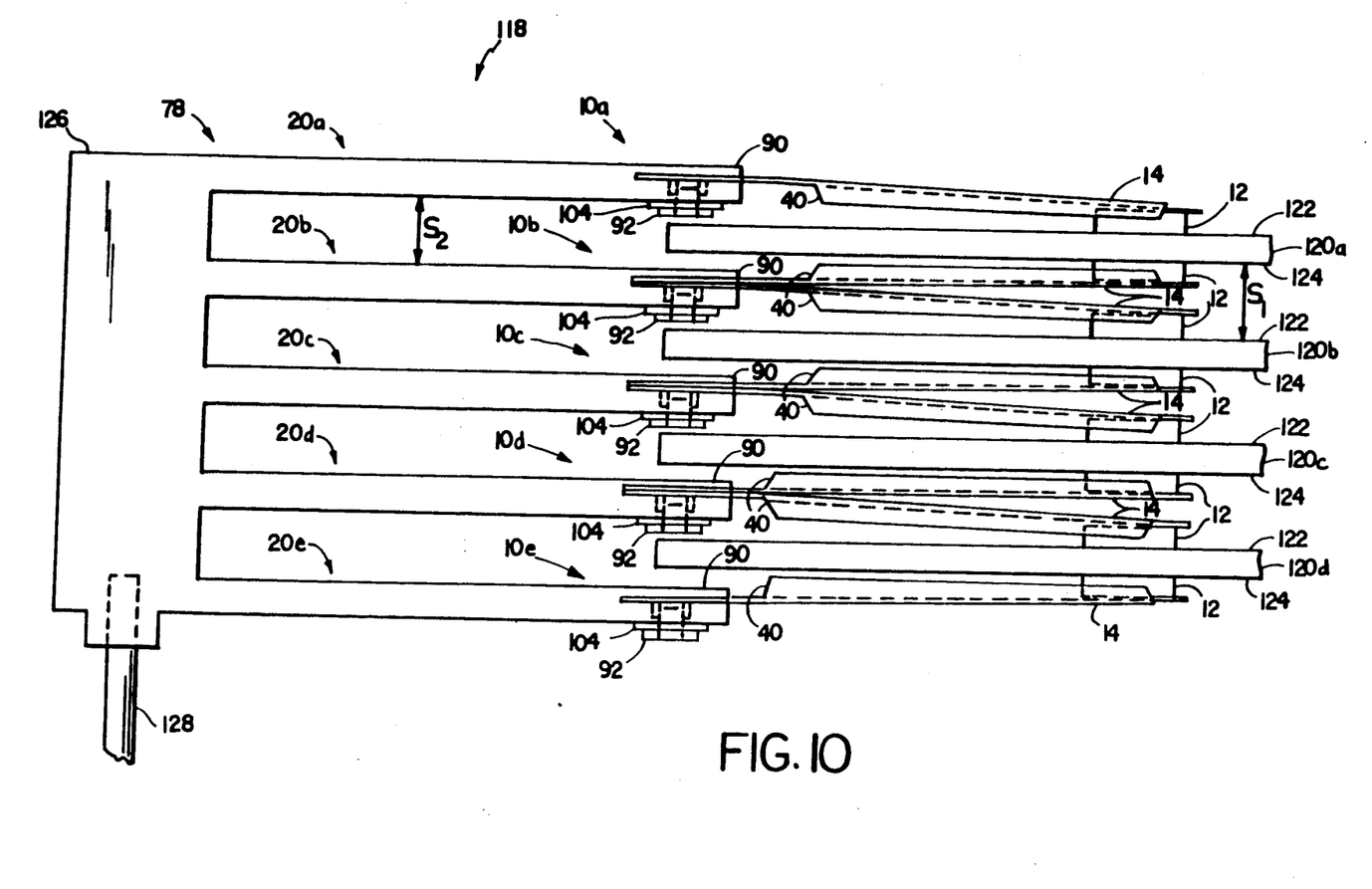
FIG. 10 is a side view of a multiple disk drive including a number of head mounting assemblies in accordance with FIGS. 1-7.

Referring to FIG. 10, a section of a multiple disk drive 118 comprising four magnetic disks 120a-120d and five mounting assemblies 10a-10e is shown. Mounting assembly 10a is identical to mounting assembly 10 of FIGS. 1-7, as is mounting assembly 10e, except that its load beam slider arm 14 faces in the opposite direction than that shown in FIGS. 1-7 (i.e., upward rather than downward). Thus, head 12 of mounting assembly 10e communicates with lower surface 124 of disk 120d, while head 12 of mounting assembly 10a communicates with upper surface 122 of disk 120a. Mounting assemblies 10b, 10c, 10d each include a pair of load beam slider arms 14, disposed back-to-back and spot welded together, carrying heads 12 for communicating with upper and lower surfaces 122, 124 of a pair of the disks. Bend region 26 (FIG. 1) of each load beam slider arm 14 is adjusted to place each head 12 in contact with its associated disk surface 122, 124 when disks 120a-120d are at rest.

In each mounting assembly 10a-10e, base (or bases) 24 of load beam slider arm (or arms) 14 is disposed in cavity 82 (FIG. 3) of a corresponding actuator arm 20a-20e. Bases 24 are releasably clamped in place by the engagement of bolt 92 with nut plate 90 in the manner described in detail above.

Preferably, actuator arms 20a-20e are fabricated as a unitary structure with proximal ends 78 thereof being integrally formed with base 126, which is rigidly connected to drive shaft 128 of a servomotor or stepping motor. Thus, as shaft 128 rotates, actuator arms 20a-20e correspondingly move heads 12 in unison across upper and lower surfaces 122, 124 of disks 120a-120d.

Adjacent disks 120a-120d (e.g., disks 120a, 120b) are separated by $S_1$, which is a function of the profile (i.e., height) of the pair of load beam slider arms 14 disposed therebetween. With the low-profile (i.e., approximately 0.0445 total height) of load beam slider arms 14, spacing $S_1$ between lower surface 124 of disk 120a and disk 120b upper surface 122 is substantially reduced (for example, to 0.125 inches). This reduced spacing still provides sufficient room for each one of the pair of load beam slider arms 14 to be lifted off respective disk surfaces 122, 124 during operation without interference from the other. With disk spacing $S_1$ reduced, multiple disk drive 118 can be made smaller. Alternately stated, more disks can be accommodated in the same amount of space within disk drive 118.

Spacing $S_2$ between adjacent actuator arms 20a-20e is relatively small, for example, approximately 0.2 inches. Thus, slots 86 (FIG. 1) in shelf 84 of each actuator arm 20a-20e greatly facilitate the assembly of mounting assemblies 10a-10e by allowing nut plate 90, bolt 92, and associated washer 104 of each clamp 88 to be loosely preassembled and slid onto shelf 84 as a unit. While slots 86 could alternately be circular holes, this would require that each bolt 92 be passed through its associated shelf 84 before being inserted into nut plate 90, which would be difficult, given the small spacing, $S_2$, between adjacent actuator arms 20a-20e.

During operation of disk drive 118, if a magnetic head 12 (for example, one of the pair of heads secured to actuator arm 20c) fails, the head is easily replaced by removing head 12 and its associated load beam slider arm 14 as a unit from actuator arm 20c in the following manner. Base 126 is rotated so that actuator arms 20a-20e are pivoted to the peripheral edges of disks 120a-120d (after a conventional pivot stop has been removed), and a comb (not shown) is inserted between heads 12 disposed against upper and lower surfaces 122, 124 of disks 120a-120d. If the comb is not used, heads 12 will clap together (due to the resiliency of load beam slider arms 14) and be damaged when the assembly is pivoted away from the peripheral edges of the disks.

Defective head 12 is replaced simply by inserting wrench 110 (FIGS. 8, 9) beneath actuator arm 20c, engaging bolt head 100 (FIG. 7), and slightly loosening bolt 92 (for example, by ¼ to ½ of a turn). Wrench 110 easily fits between actuator arms 20c, 20d and operates easily to loosen bolt 92. Then, the load beam slider arm carrying the defective head is pulled out of clamp 88 (i.e., slid from between underside 95 of nut plate 90 and shelf surface 80 in the opposite direction of arrow 108 in FIG. 3) in the manner discussed above (after removing the electrical lead of head 12 from its connection in disk drive 118). The other load beam slider arm 14 mounted on actuator arm 20c is maintained between plate 94 and shelf 84. Then, a new head 12 and load beam slider arm 14 are inserted as a unit and clamped onto actuator arm 20c in the manner described above, again using wrench 110. The electrical lead of the new head 12 is then connected in disk drive 118. The multi-arm assembly is pivoted to re-engage heads 12 with surfaces 122, 124 of disks 120a–120d, and the comb is removed.

Other embodiments are within the scope of the following claims. For example, stiffeners 38 could alternatively be separate members attached (e.g., by spot welding) to surface 18b.

Figure 11:
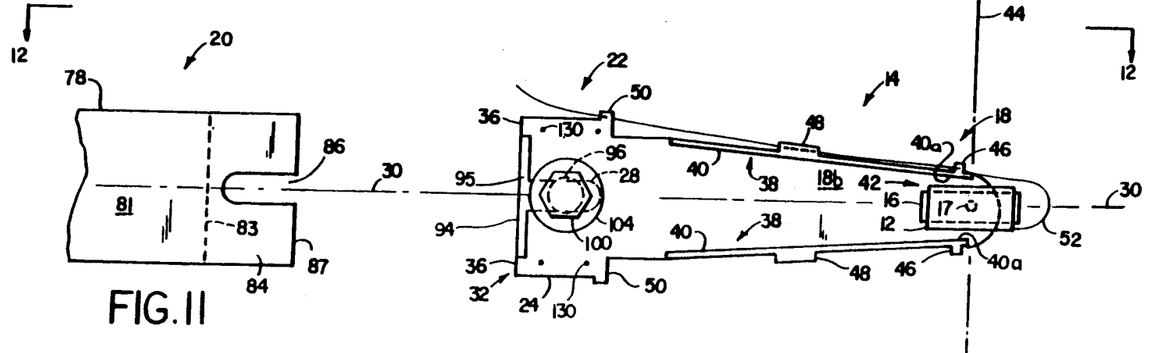
FIG. 11 is a plan view of the underside of a load beam slider arm and actuator arm according to another embodiment of the head mounting assembly of the invention.
Figure 12:
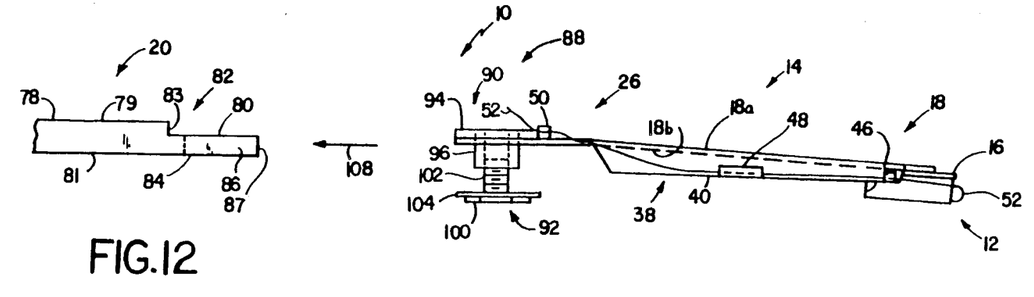
FIG. 12 is a side view of the load beam slider arm and actuator arm of FIG. 11 taken along line 12—12.

Additionally, referring to FIGS. 11 and 12, threaded clamp 88 could alternatively be permanently attached to load beam base 24, such as by attaching underside 95 of nut plate 94 to the upper surface of load beam base 24 with a series of spot welds 130. Throat 96 protrudes through slot 28 (which could alternatively be a circular hole) in base 24, and threadably receives bolt 100. Mounting assembly 10 is assembled simply by sliding load beam slider arm 14 and partially assembled clamp 88 as a unit onto actuator arm shelf 84 in the direction of arrow 108, with throat 96 being inserted in actuator arm slot 86. Thus, nut plate 94 and base 24 are inserted as a unit into actuator arm cavity 92. Then, bolt 92 is tightened (preferably with wrench 110) in the manner discussed above. Disassembly follows the reverse of these steps.

The arrangement of FIGS. 11 and 12 reduces the number of parts that need be inserted onto actuator arm 20. That is, rather than initially inserting clamp 88 on shelf 84 and then sliding load beam slider arm 14 onto the shelf, load beam slider arm 14 and clamp 88 are inserted onto actuator arm 20 in one step.

I claim:

1. An arm for mounting a head in a disk drive, comprising
    a first member comprising a single, elongated piece of material having a distal region for supporting the head on a surface thereof and a proximal region having an end adapted to be mounted on a support in the disk drive, said single piece of material being resilient between said proximal region and said distal region to urge the head against a surface of the disk when the disk is at rest,
    a slider disposed on said surface in said distal region for carrying said head, said slider being adapted to slide on a stream of air when the disk is rotating to lift the head away from the disk surface, and
    a second member for stiffening said first member, said second member being angularly disposed with respect to said surface on the same side of said surface as the head, said second member being disposed alongside at least a portion of said slider and extending along said single piece of material to said proximal region.

2. The arm of claim 1 wherein said first member comprises a blade including said surface, and said second member comprises a wall integrally formed with said blade and disposed at an angle of approximately 90° with respect to said surface.

3. The arm of claim 1 wherein a portion of said second member is adapted to restrain an electrical lead of said head against said second member.

4. The arm of claim 1 wherein a portion of said second member is adapted to be engaged for mounting and demounting said arm in said disk drive.

5. The arm of claim 1 wherein a portion of said second member comprises a tab forming a channel with said second member for receiving an electrical lead of said head, said tab having at least one surface adapted to be engaged for mounting and demounting said arm in said disk drive.

6. The arm of claim 1 wherein said first member and second member are integrally formed.

7. The arm of claim 1 further comprising a base proximally disposed with respect to said first member for mounting said arm on an actuator in the disk drive, said base being integrally formed with said first and second members.

8. The arm of claim 7 wherein said base includes a tab forming a channel with said actuator for receiving said an electrical lead of said head.

9. An arm for mounting a head in a disk drive, comprising
    a single, elongated piece of material having a distal end region for supporting the head on a mounting surface thereof and a proximal region having an end adapted to be mounted on a support in the disk drive, said single piece of material being resilient between said proximal region and said distal region to urge the head against a surface of the disk when the disk is at rest,
    a slider disposed on said mounting surface for carrying said head, said slider being adapted to slide on a stream of air when the disk is rotating to lift the head away from the disk surface, and
    a pair of side regions angularly disposed with respect to said mounting surface to straddle at least a portion of said slider, said side regions extending longitudinally along said single piece of material proximally of said distal end region.

10. The arm of claim 9 wherein said end region comprises a blade including said mounting surface, said head being adapted to be disposed on a gimbal on said mounting surface, said pair of side regions each comprising a wall, said head being disposed adjacent at least a portion of each said wall.

11. The arm of claim 10 wherein said wall portions are spaced sufficiently to allow said head to move on said gimbal without contacting either wall portion.

12. The arm of claim 10 wherein said wall portions are integrally formed with said blade.

13. An arm for mounting a head in a disk drive, comprising
    a single piece of material having a distal end region for supporting the head on a mounting surface thereof and a proximal region having an end adapted to be mounted on a support in the disk drive, said single piece of material being resilient between said proximal region and said distal region to urge the head against a surface of the disk when the disk is at rest,
    a slider disposed on said mounting surface for carrying said head, said slider being adapted to slide on a stream of air when the disk is rotating to lift the head away from the disk surface, and
    a pair of side regions angularly disposed with respect to said mounting surface to form a channel with said mounting surface within which at least a portion of said slider is disposed, said side regions being longitudinally disposed along said single piece of material and extending continuously from said distal end region to said proximal region.

14. The arm of claim 13 wherein said head is mounted on a gimbal on said mounting surface, said channel being sufficiently wide to allow said head to move on the gimbal without contacting said side regions.

15. The arm of claim 13 wherein a portion of at least one of said pair of side regions is adapted to restrain an electrical lead of said head against said side region.

16. The arm of claim 13 wherein a portion of at least one of said pair of side regions is adapted to be engaged for mounting and demounting said arm in said disk drive.

17. A disk drive comprising
at least one disk,
a head for communicating with said disk, and
an arm for mounting said head in said disk drive, said arm comprising: a single piece of material having a distal end region for supporting said head on a mounting surface thereof and a proximal region having an end adapted to be mounted on a support in the disk drive, said single piece of material being resilient between said proximal region and said distal region to urge the head against a surface of the disk when the disk is at rest; a slider disposed on said mounting surface for carrying said head, said slider being adapted to slide on a stream of air when the disk is rotating to lift the head away from the disk surface; and, a pair of side regions angularly disposed with respect to said mounting surface to form a channel with said mounting surface within which at least a portion of said slider is disposed, said side regions being longitudinally disposed along said single piece of material and extending proximally of said distal end region.

18. The disk drive of claim 17 including a pair of spaced disks and a pair of said arms, said pair of arms being mounted back-to-back on an actuator in said disk drive, with the head carried by a first one of said pair of arms communicating with a surface of a first one of the pair of spaced disks and the head carried by a second one of said pair of arms communicating with a surface of a second one of said pair of disks.

19. The disk drive of claim 17 wherein said head is disposed on a gimbal on said mounting surface, said mounting surface having a width in said channel selected to stiffen said arm in a direction perpendicular to a longitudinal axis of said arm and to allow said head to move on the gimbal without contacting said pair of side regions.

20. The disk drive of claim 17 wherein said arm comprises a base region, proximally disposed with respect to said end region and pair of side regions, for mounting said arm on an actuator.

21. The disk drive of claim 20 wherein said actuator has a longitudinal axis, said base region and actuator comprising means for aligning said arm and head laterally along said longitudinal axis.

22. The disk drive of claim 21 wherein said base region and actuator comprise means for aligning said arm and head axially with respect to said longitudinal axis.

23. The disk drive of claim 20 wherein said base region, end region, and side regions are integrally formed.

24. A disk drive comprising
a pair of disks having spaced, opposing surfaces,
a pair of heads of the kind for communicating with the spaced, opposing surfaces of said pair of disks, and
a pair of arms for mounting said pair of heads in said disk drive, each one of said pair of arms comprising:
(i) a member comprising a single, elongated piece of material having a distal region for supporting one of said heads on a mounting surface thereof and a proximal region having an end adapted to be mounted on a support in the disk drive, said single piece of material being resilient between said proximal region and said distal region to urge the head against one of said opposing surfaces of one of said disks when the disk is at rest, said single piece of material having a second surface opposite to said mounting surface, the second surfaces of said pair of arms opposing each other;
(ii) a slider disposed on said mounting surface for carrying said head, said slider being adapted to slide on a stream of air when the disk is rotating to lift the head away from the disk surface; and
(iii) a pair of side regions for stiffening said member, said side regions being angularly disposed with respect to said mounting surface to form a channel with said mounting surface within which at least a portion of said slider is disposed, said side regions extending continuously from said mounting surface to said proximal region of said single piece of material,
whereby said side regions of said pair of arms allow the second surfaces of said pair of arms to become closely disposed with respect to one another without interference from said side regions when said sliders lift said heads.

* * * * *